United States Patent
Katikaneni et al.

(10) Patent No.: US 7,063,732 B2
(45) Date of Patent: Jun. 20, 2006

(54) HIGH-CAPACITY SULFUR ADSORBENT BED AND GAS DESULFURIZATION METHOD

(75) Inventors: Sai P. Katikaneni, Brookfield, CT (US); Sanjay C. Parab, West Hartford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 86 days.

(21) Appl. No.: 10/628,653

(22) Filed: Jul. 28, 2003

(65) Prior Publication Data

US 2005/0022449 A1    Feb. 3, 2005

(51) Int. Cl.
*B01D 53/04* (2006.01)
*H01M 8/06* (2006.01)

(52) U.S. Cl. .................... 95/135; 96/132; 96/135; 585/822

(58) Field of Classification Search ................ 95/135, 95/136; 96/131, 132, 133, 135, 153; 423/230, 423/242.1; 585/822; 208/243, 245, 246
See application file for complete search history.

(56) References Cited

U.S. PATENT DOCUMENTS

| | | | |
|---|---|---|---|
| 3,051,646 A | 8/1962 | Brooke | |
| 3,620,969 A | 11/1971 | Katonah et al. | |
| 3,660,967 A * | 5/1972 | Collins et al. | 95/137 |
| 4,359,592 A | 11/1982 | Chao et al. | |
| 5,034,118 A | 7/1991 | Bricker et al. | |
| 5,061,455 A | 10/1991 | Brose et al. | |
| 5,114,689 A * | 5/1992 | Nagji et al. | 423/230 |
| 5,137,549 A | 8/1992 | Stanford et al. | |
| 5,146,039 A * | 9/1992 | Wildt et al. | 585/820 |
| 5,447,701 A | 9/1995 | Inoue et al. | |
| 5,656,065 A | 8/1997 | Kalbassi et al. | |
| 5,720,797 A | 2/1998 | Yates et al. | |

(Continued)

FOREIGN PATENT DOCUMENTS

JP    2003-020489 A  *  1/2003

(Continued)

OTHER PUBLICATIONS

Fuel Cell Handbook, 5th Ed., U.S. Department of Energy, Oct. 2000, pp. 1-31 to 1-32, 5-15 to 5-17, 6-25 to 6-28, 9-9 to 9-11, 9-17 to 9-30, 9-41, 9-45 to 9-48, 9-50 to 9-52, 9-54 to 9-56.

(Continued)

*Primary Examiner*—Frank M. Lawrence
(74) *Attorney, Agent, or Firm*—Cowan, Liebowitz & Latman, P.C.

(57) ABSTRACT

A fuel processing system and method for processing fuel for a fuel cell having a first adsorbent bed for adsorption of high molecular weight organic sulfur-containing compounds and inorganic sulfur-containing compounds, and a second adsorbent bed for adsorption of low molecular weight organic sulfur-containing compounds, where the adsorbent beds are arranged such that the fuel to be processed passes through one of the adsorbent beds and, thereafter through the other adsorbent bed.

41 Claims, 4 Drawing Sheets

U.S. PATENT DOCUMENTS

| | | | |
|---|---|---|---|
| 5,755,857 | A | 5/1998 | Acharya et al. |
| 5,843,300 | A | 12/1998 | Zinnen et al. |
| 5,948,398 | A * | 9/1999 | Hanamoto et al. ......... 424/76.1 |
| 6,017,382 | A | 1/2000 | Ji et al. |
| 6,060,032 | A | 5/2000 | Hable et al. |
| 6,074,459 | A * | 6/2000 | Gingrich et al. ............... 95/118 |
| 6,132,612 | A | 10/2000 | Bourgeois |
| 6,159,256 | A | 12/2000 | Bonville, Jr. et al. |
| 6,190,428 | B1 | 2/2001 | Rolison et al. |
| 6,454,935 | B1 | 9/2002 | Lesieur et al. |
| 6,579,347 | B1 * | 6/2003 | Wakita et al. ................. 95/135 |
| 2003/0113598 | A1 * | 6/2003 | Chow et al. ................... 429/17 |
| 2004/0118747 | A1 * | 6/2004 | Cutler et al. ............ 208/208 R |

FOREIGN PATENT DOCUMENTS

WO      WO 98/51762      11/1998

OTHER PUBLICATIONS

M. Steijns, F. Derks, A. Verloop, and P. Mars, The Mechanism of the Catalytic Oxidation of Hydrogen Sulfide; Part II. Kinetics and Mechanism of Hydrogen Sulfide Oxidation Catalyzed by Sulfur, Journal of Catalysis, vol. 42, pp. 88-90(1976).

M. Steijns, P. Koopman, B. Nieuwenhuijse and P. Mars, The Mechanism of the Catalytic Oxidation of Hydrogen Sulfide; III. An Electron Spin Resonance Study of the Sulfur Catalized Oxidation of Hydrogen Sulfide, Journal of Catalysis, vol. 42, pp. 96-99 (1976).

G. Steinfeld, R. Sanderson, H. Ghezel-Ayagh, S. Aabens, and M. Cervi, Distillate Fuel Processing for Marine Fuel Cell Operations, AIChE Spring Meeting, Atlanta, GA, Mar. 5-9, 2000, pp. 2-5.

S. Abens, H. Ghezel-Ayagh, G. Steinfeld, R. Sanderson, and M. Cervi, Development of a Ship Service Fuel, All Electric Ships 2000, Paris, France, Oct. 26-27, 2000, pp. 3-5.

T.J. Bandosz, Virgin Activated Carbons as Sorbents of Hydrogen Sulfide, Fundamentals of Adsorption 6, Elsevier, (May 1998), pp. 635-640.

T.J. Bandosz and Q. Le, Evaluation of Surface Properties of Exhausted Carbons Used as H2S Adsorbents in Sewage Treatment Plants, Carbon, vol. 36, p. 39-40 (1998).

M. Steijns and P. Mars, The Mechanism of the Catalytic Oxidation of Hydrogen Sulfide. Part II. Kinetics and Mechanism of Hydrogen Sulfide Oxidation Catalyzed by Sulfur, Journal of Catalysis, vol. 35, pp. 11-13 (1974).

A. Bagreev, H. Rahmna and T.J. Bandosz, Wood-Based Activated Carbons as Adsorbents of Hydrogen Sulfide: A Study of Adsorption and Water Regeneration Processes, Ind. Eng. Chem. Res., vol. 39, pp. 3849-3850, 3853-3854 (2000).

A. Bagreev, H. Rahman and T.J. Bandosz, Study of H2S Adsorption and Water Regeneration of Coconut-Based Activated Carbon, Environ. Sci. Technol., vol. 34, p. 4587-4588 (2000).

A. Turk, K. Mahmood and J. Mozaffari, Activated Carbon for Air Purification in New York City's Sewage Treatment Plants, Water Science and Technology, vol. 27 (7-8), pp. 121-123 (1993).

A. Primavera, A. Trovarelli, P. Andreussi, and G. Dolcetti, The Effect of Water in the Low-Temperature Catalytic Oxidation of Hydrogen Sulfide to Sulfur Over Activated Carbon, Applied Catalysis A: General, vol. 173, pp. 185-187, 192 (1998).

A. Dalai, and E. L. Tollefson, Kinetics and Reaction Mechanism of Catalytic Oxidation of Low Concentrations of Hydrogen Sulfide in Natural Gas Over Activated Carbon, The Canadian Journal of Chemical Engineering, vol. 76, pp. 902-904, 913 (1998).

A. Bagreev, H. Rahman and T.J. Bandosz, Thermal Regeneration of a Spent Activated Carbon Previously Used as Hydrogen Sulfide Adsorbent, Carbon, vol. 39, pp. 1319-1320 (2001).

\* cited by examiner

HIGH-CAPACITY SULFUR ADSORBENT BED AND GAS DESULFURIZATION METHOD

BACKGROUND OF THE INVENTION

This invention relates to fuel cells and, in particular, to a fuel processing system for use with such fuel cells.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Molten carbonate fuel cells operate by passing a reactant fuel gas through the anode, while oxidizing gas is passed through the cathode. In order to produce a useful power level, a number of individual fuel cells are stacked in series with an electrically conductive separator plate between each cell.

Current fuel cell technology requires clean fuel gas composed of hydrogen or a mixture of hydrogen and carbon monoxide, which can be generated from hydrocarbon-containing feedstocks such as natural gas, petroleum-based liquids or coal through a reforming process. Most hydrocarbon-containing feedstocks contain sulfur, which causes reforming and anode catalyst poisoning and is known to significantly diminish the performance of fuel cell anodes and reforming catalysts. Therefore, as part of the reforming process, sulfur and sulfur-containing compounds have to be removed from the fuel gas to a part per billion level before the fuel gas enters the fuel cell.

The present state-of-the-art uses a combination of a hydrodesulfurization reaction with a zinc oxide adsorption bed in order to remove sulfur-containing compounds from the fuel gas. This method is generally used to remove sulfur-containing compounds, particularly mercaptan odorant compounds, from natural gas fuel. Hydrodesulfurization reaction is accomplished by reacting sulfur-containing compounds in the fuel with recycled hydrogen to produce hydrogen sulfide. During the hydrodesulfurization reaction, the fuel is passed over a catalyst where sulfur-containing compounds in the fuel react with hydrogen to produce hydrogen sulfide, or, alternatively, sulfur-containing compounds in the fuel can be reacted with hydrogen at temperatures above 570 degrees Fahrenheit (hot gas desulfurization).

In a conventional hot gas desulfurization system, fuel gas is mixed with recycled reformed gas prior to entering a heat exchanger, where it is heated to 570–750 degrees Fahrenheit and undergoes a reaction with the hydrogen in the recycled reformed gas to produce hydrogen sulfide ($H_2S$). The fuel gas is then delivered to a desulfurizer where the $H_2S$ is removed from the fuel gas by adsorption in a zinc oxide bed. The resulting desulfurized fuel gas may then be delivered to the fuel processor of the fuel cell.

In the hydrodesulfurization system using a catalyst, the catalyst is used to react the sulfur-containing compounds in the fuel with the recycled hydrogen to produce hydrogen sulfide. In such a system, the fuel gas and the recycled reformed gas are first mixed and heated in the preheater vessel, after which the gas mixture is delivered to a hydrodesulfurization section. This section includes a hydrodesulfurization catalyst and a zinc oxide adsorbent in a single vessel. When the fuel gas mixture enters the hydrodesulfurization section, the sulfur-containing compounds are irreversibly converted to hydrogen sulfide ($H_2S$) by the hydrodesulfurization reaction over the hydrodesulfurization catalyst, and the resulting $H_2S$ is adsorbed by the zinc oxide prior to exiting the hydrodesulfurization system.

Conventional desulfurization systems have also used multiple adsorbent beds to remove sulfur from fuel. For example, U.S. Pat. No. 3,620,969 teaches the use of two beds of crystalline zeolitic molecular sieve material piped so that when one bed is on the adsorption stroke, the other bed is being regenerated by purging and cooldown. In addition, U.S. Pat. No. 5,720,797 describes a pressure swing adsorption-desorption process for recovering sulfur hexafluoride from a gas stream using zeolites, activated carbons or silicates as adsorbents.

As can be appreciated from the above, the conventional hydrodesulfurization systems require high temperature and a hydrogen recycling system which supplies sufficient hydrogen concentration to convert sulfur-containing compounds to hydrogen sulfide. Moreover, depending on the hot desulfurizer operating temperature, an additional heat exchanger may be required to heat the gas to the required temperature.

With respect to the conventional activated carbon adsorbent systems, activated carbon adsorbents are selective to remove only certain types of sulfur-containing compounds and are not able to trap all organic and inorganic sulfur-containing compounds that are present in hydrocarbon-containing feedstocks. Particularly, most of the activated carbon adsorbents are unable to trap certain low molecular weight organic compounds such as dimethyl sulfide (DMS) and ethyl methyl sulfide (EMS).

In addition, the capacities of conventional adsorbent bed systems are relatively low to meet the size constraints of fuel cell systems, having a life of approximately 2 to 3 months. As a result, conventional systems are not very cost effective. Furthermore, conventional systems using multiple beds use the same adsorbent in each of the beds for continuous operation and thus are not able to remove all types of sulfur-containing compounds.

It is therefore an object of the present invention to provide a fuel processing system for fuel cells which is better able to remove all types of sulfur-containing compounds.

It is a further object of the invention to provide a high-capacity fuel processing system for fuel cells which has an increased life and is cost effective.

SUMMARY OF THE INVENTION

In accordance with the principles of the invention, the above and other objectives are realized in a fuel cell fuel processing system and method wherein a first adsorbent bed is provided for adsorption of high molecular weight organic sulfur-containing compounds and inorganic sulfur-containing compounds, and a second adsorbent bed is provided for adsorption of low molecular weight organic sulfur-containing compounds, and wherein the adsorbent beds are arranged such that the fuel to be processed passes through one of the first and second beds and, thereafter through the other of the first and second beds. Preferably, the first and second beds are disposed in a common reaction vessel with the second adsorbent bed following the first adsorbent bed relative to the direction of the flow of the fuel being processed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
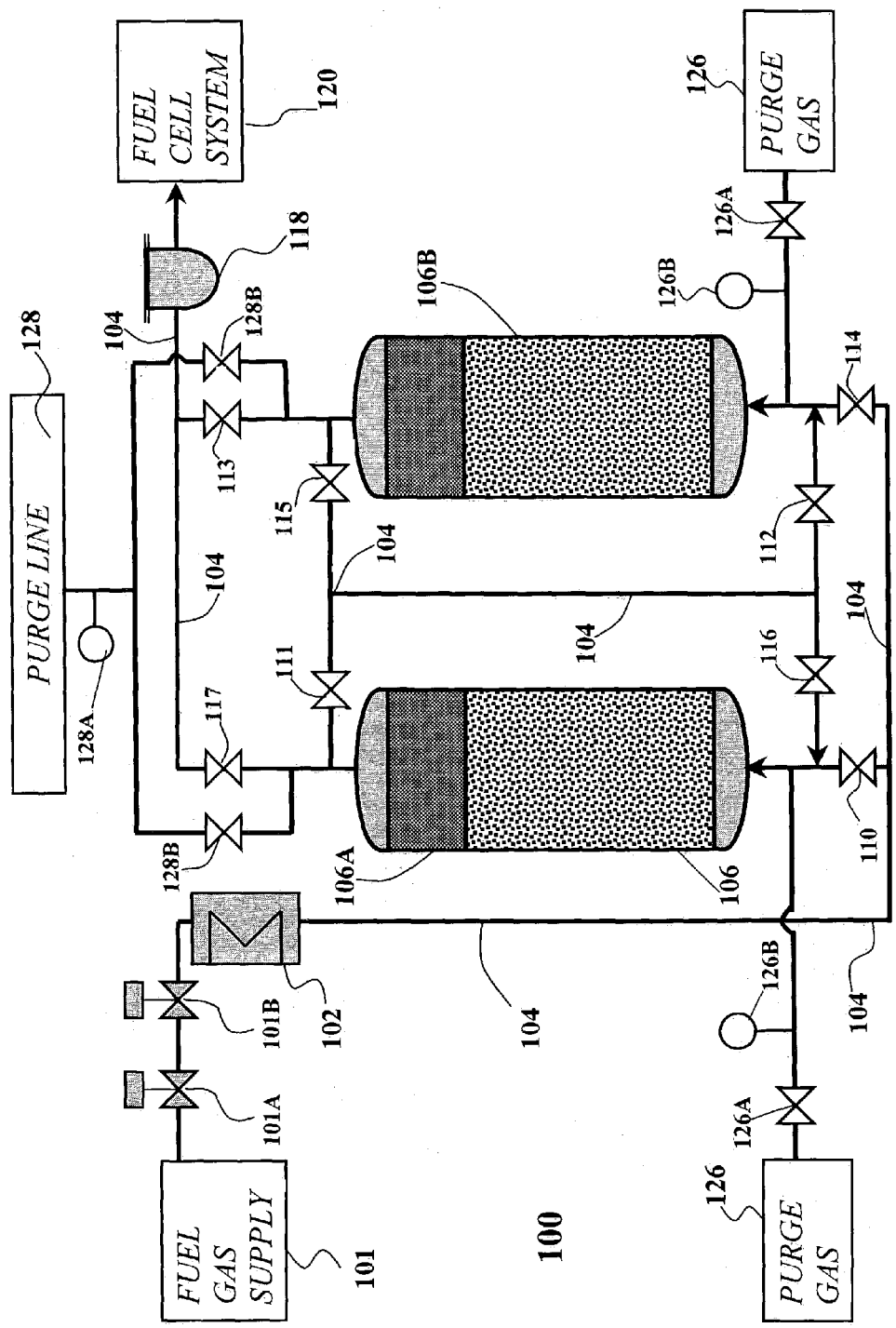
FIG. 1 shows a fuel processing system in accordance with the principles of the present invention.

FIG. 1 illustrates a fuel processing system 100 in accordance with the principles of the present invention. The fuel processing system 100 is supplied with fuel from a fuel supply, shown as fuel gas supply 101, and delivers processed fuel to a fuel cell system 120. The processing system 100 includes supply control valves 101A and 101B, a heat exchanger 102, a desulfurizer assembly 106, a fuel gas filter 118, a purge line 128 and a gas purge 126. Delivery or connecting conduits or lines 104 connect these components and valves 110 through 117 in the lines 104 control the flow of gas therethrough. As shown, the desulfurizer assembly 106 includes two like desulfurizers 106A and 106B which are configured to remove sulfur in accordance with the principles of the present invention.

In an overview of the operation of the fuel processing system 100, fuel gas containing sulfur compounds from the fuel gas supply 101 is coupled to the system through the opening of the supply control valves 101A and 101B. The gas flows through the heat exchanger 102, which acts to maintain a uniform temperature of the gas. After exiting the heat exchanger, the fuel gas is then delivered to the desulfurizer assembly 106 which carries out a sulfur adsorption process to remove sulfur-containing compounds from the gas. The desulfurized fuel gas exiting the assembly 106 is conveyed via a line 104 to the filter 118. The filter 118 removes particulate matter, such as carbon and zeolite particles, from the desulfurized fuel gas and the resultant gas is delivered to the fuel cell system 120.

As above-mentioned and as shown in FIG. 1, the desulfurizer assembly 106 includes the desulfurizers 106A and 106B which are connected via the lines 104 and the control valves 110–117. With this arrangement, the desulfurizers 106A and 106B can be operated in series, where the fuel gas is processed by both desulfurizers 106A and 106B prior to being delivered to the fuel cell system. The desulfurizers can also be operated in a "lead lag" system, where one of the desulfurizers 106A or 106B is operated in "lead" mode while the other desulfurizer is in a "lag" mode. Additionally, the desulfurizers can be operated in parallel, where one of the desulfurizers 106A or 106B is operational while the other desulfurizer is in a "standby" mode.

In series operation, the valves 110–113 are opened and the valves 114–117 closed. In this case, as a result of the open valve 110, fuel gas is first delivered to the desulfurizer 106A via a line 104. After undergoing a sulfur adsorption process in the desulfurizer 106A, the fuel gas passes to the second desulfurizer 106B via a line 104 as a result of the open valves 111 and 112. After undergoing a further sulfur adsorption process in the desulfurizer 106B, the desulfurized fuel is carried through the valve 113 to the filter 118, and from there to the fuel cell system 120.

In "lead lag" operation, as mentioned above, the desulfurizers 106A and 106B are also operated in series, but in alternating cycles. In this case, one of the desulfurizers acts as the "working", or the "lead", unit to remove almost all of the sulfur-containing compounds at the beginning of a treatment period, and the other desulfurizer is in the "lag" mode and acts to polish the fuel gas by further removing sulfur-containing compounds. When the "lead" desulfurizer is exhausted, the fuel gas flow is directed to the other desulfurizer in the "lag" mode, while the spent adsorbent material is removed from the "lead" desulfuzer. The "lagged" desulfurizer then becomes the "lead" unit, and the previously "lead" desulfurizer, with new adsorbent material, operates in the "lag" mode. "Lead lag" operation allows one of the desulfurizers to be changed or regenerated while maintaining continuous operation of the fuel processing system 100.

If the desulfurizer 106A operates as the "lead"unit and the desulfurizer 106B is in "lag" mode (a condition which results from opening valves 110–113 and closing valves 114–117), the fuel gas is carried from the heater 102 through the open valve 110 to the desulfurizer 106A. After undergoing a sulfur adsorption process in the desulfurizer 106A, the fuel gas is carried through the open valves 111 and 112 to the desulfurizer 106B where the fuel gas is polished by further removing sulfur-containing compounds. The fuel gas is then carried through the filter 118 and is then delivered to the fuel cell system 120. During this operation, as mentioned above, the valves 114–117 remain closed.

After the "lead" desulfurizer 106A is exhausted, the fuel gas is re-directed to the desulfurizer 106B by opening the valve 114 and by closing the valves 110–112. During this operation, no fuel gas passes through the desulfurizer 106A and the adsorbent material in the desulfurizer 106A can be changed or regenerated.

After the desulfurizer 106A is regenerated, the desulfurizer 106B becomes the "lead" unit and the desulfurizer 106A is in "lag" mode (a condition which results from opening valves 115–117 and closing valve 13). The fuel gas in this case is carried from the heater 102 through the open valve 114 to the desulfurizer 106B. After undergoing a sulfur adsorption process in the desulfurizer 106B, the desulfurized fuel gas is delivered to the desulfurizer 106A via the open valves 115 and 116. The gas is further desulfurized in the unit 106A and is then delivered to the filter 118 through the open valve 117 and from the filter 118 to the fuel cell system 120. During this operation, as indicated previously, the valves 110–113 remain closed.

As mentioned above and described more fully below, the desulfurizers can also be operated in parallel, where one of the desulfurizers 106A or 106B is operational at any given time, i.e. fuel gas is being passed through the one desulfurizer, while the other desulfurizer is in a "standby" mode. Such operation allows the desulfurizer in "standby" to be changed or regenerated while maintaining continuous operation of the fuel processing system 100.

If the desulfurizer 106A is operational and the desulfurizer 106B is in "standby" mode (a condition which results from opening valves 110 and 117 and closing valves 111–116), the fuel gas is carried from the heater 102 through the open valve 110 to the desulfurizer 106A. After undergoing a sulfur adsorption process in the desulfurizer 106A, the fuel gas is carried through the open valve 117 to the filter 118 and is then delivered to the fuel cell system 120. During this operation, as mentioned above, the valves 111–116 remain closed and no fuel gas passes through the desulfurizer 106B.

If the desulfurizer 106B is operated and the desulfurizer 106A is in "standby" node (a condition which results from opening valves 113 and 114 and closing valves 110–112 and 115–117), the fuel gas is carried from the heater 102 through the open valve 114 to the desulfurizer 106B. After undergoing a sulfur adsorption process in the desulfurizer 106B, the desulfurized fuel gas is delivered to the filter 118 through the open valve 113 and then to the fuel cell system 120. During this operation, as indicated previously, the valves 110–112 and 115–117 remain closed so that no fuel gas is delivered to the desulfurizer 106A.

As illustrated in FIG. 1, the fuel processing system 100 is also provided with a purging system comprising a purge gas supply 126 and a purge line 128. The purging system may be used to eliminate air and moisture from the fuel processing system 100 prior to supplying the fuel gas from the fuel gas supply system 101 or to purge fuel during bed changeover. In operating the purging system, purge gas, such as, for example nitrogen, is delivered from the purge gas supply system 126 into the fuel processing system 100 through valves 126A and 126B. After being carried through the fuel processing system 100, a mixture of purge gas, air and moisture is removed from the system 100 through the valves 128A and 128B to the purge line 128.

Figure 2:
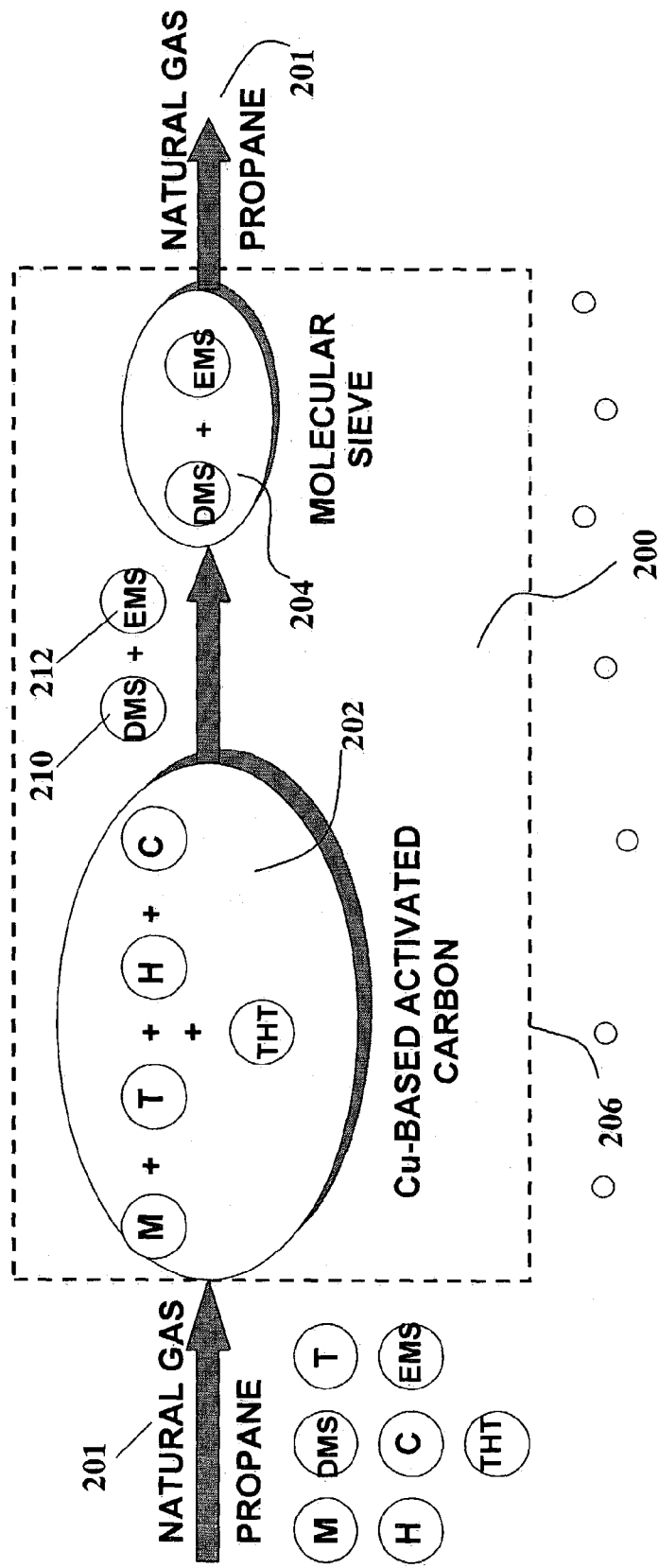
FIG. 2 shows a view of a high-capacity sulfur adsorbent bed utilized in the fuel processing system of FIG. 1.

As discussed above, each of the desulfurizers 106A and 106B is of similar construction and each is designed, in accordance with the principles of the present invention, to efficiently remove sulfur-containing compounds from the fuel supply gas. FIG. 2 shows schematically the construction of the desulfurizer 106A. In accordance with the invention, and as shown in FIG. 2, the desulfurizer 106A comprises a high-capacity sulfur adsorbent bed 200. In particular, the bed 200 includes a first adsorbent bed 202 for trapping inorganic sulfur-containing compounds and high molecular weight (molecular weights greater than 65) organic sulfur-containing compounds, and a second adsorbent bed 204 for trapping low molecular weight (molecular weights equal to or less than 65) organic sulfur-containing compounds.

In the case shown, the first adsorbent bed 202 comprises a copper and chromium impregnated activated carbon. This material traps high molecular weight organic sulfur-containing compounds and inorganic sulfur-containing compounds as the fuel gas is carried through the bed. High molecular weight organic sulfur-containing compounds include, but are not limited to, mercaptans (M), thiophene (T) and tetrahedro thiophene (THT). Inorganic sulfur-containing compounds include, but are not limited to carbonyl sulfide (C) and hydrogen sulfide (H).

The second adsorbent bed 204, in the case shown, comprises molecular sieves, such as zeolites, which are aluminosilicate crytalline polymers having a three-dimensional interconnecting network of silica and alumina tetrahedra. The zeolite-based adsorbent bed 204 has a unique pore size and traps low molecular weight organic sulfur-containing compounds as the fuel gas is carried through the bed. The latter compounds are less than or equal to 65 in molecular weight and include, but are not limited to, dimethyl sulfide (DMS) 210 and ethyl methyl sulfide (EMS) 212.

In the illustrative embodiment of FIG. 2, the copper-based activated carbon adsorbent 202 is firstly disposed in the desulfurizer vessel 106A in relation to the direction of the flow or flow path 201 of the fuel gas and to the entrance of the fuel gas into the desulfurizer vessel. The zeolite-based adsorbent 204 then follows the bed 202 in the direction of the flow path.

The copper-based activated carbon adsorbent bed 202 may contain a copper-chromium-based activated carbon manufactured by NORIT Americas, Inc. The zeolite-based adsorbent bed may contain a sodium-zeolite adsorbent manufactured by Engelhard Corporation. As can be appreciated, the optimal design of the adsorbent bed 200 will vary with the type of fuel gas being processed, the residence time of the fuel gas in the bed, the shape and size of the solid adsorbent, the concentration levels of sulfur-containing compounds, the amount of gas to be treated and other factors. An illustrative example of a bed construction will be described later on herein below.

Figure 3:
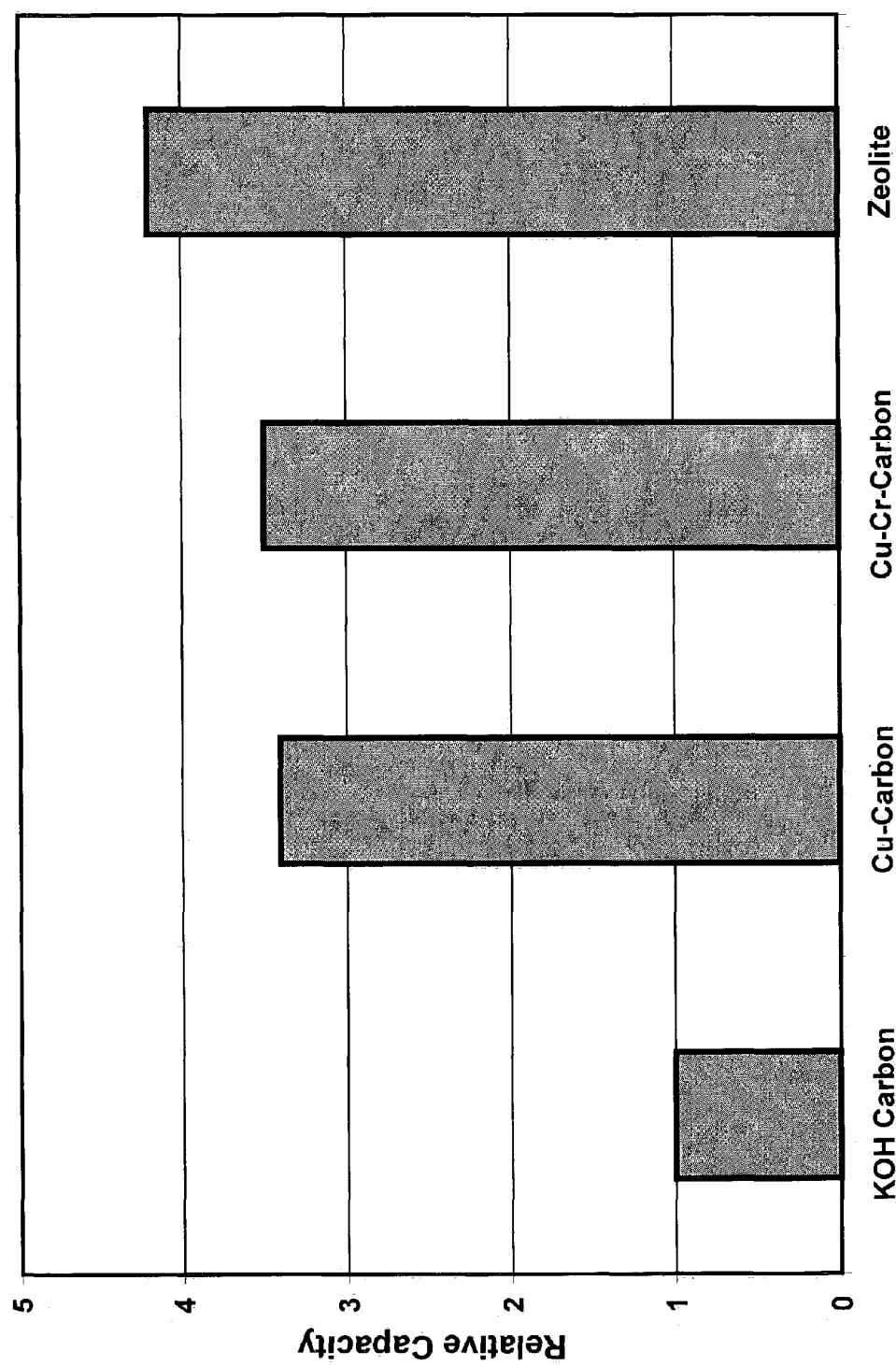
FIG. 3 shows relative capacity data of different adsorbents.

FIG. 3 shows a bar graph of relative performance data for the copper-based activated carbon adsorbent and the zeolite-based adsorbent used in beds 202 and 204 as compared to relative performance data for a conventional baseline potassium hydroxide impregnated activated carbon sulfur adsorbent. The Y-axis in FIG. 3 represents the relative capacity of each adsorbent, based on the weight percentage of sulfur-containing compounds removed before the exit concentration of sulfur-containing compounds exceeds an acceptable sulfur concentration of 100 parts per billion by volume. The relative capacity of each adsorbent is directly related to the performance of each adsorbent.

As shown in FIG. 3, the relative capacity of the baseline adsorbent is much lower (approximately 4 times lower) than the relative capacity of each of the adsorbents used in the high-capacity sulfur adsorbent bed 200 of the invention. More particularly, the adsorbent capacities of the copper-based activated carbon adsorbent and the zeolite-based adsorbent of the bed 200 are approximately three times higher than the capacity of the conventional KOH-based activated carbon adsorbent. Higher adsorbent capacities of the copper-based activated carbon adsorbent and the zeolite-based adsorbent result in a longer life of the high-capacity sulfur adsorbent bed 200 as compared to the life of conventional sulfur adsorbent beds.

FIG. 3 also shows the relative capacity of a copper-chromium-based activated carbon adsorbent bed which can be used as an alternative to the copper-based activated carbon adsorbent bed used for the bed 202. As shown in FIG. 3, the adsorbent capacity of the copper-chromium-based activated carbon adsorbent is approximately similar to the adsorbent capacity of the copper-based activated carbon adsorbent. However, the copper loading on the copper-chromium-based activated carbon adsorbent is lower, resulting in lower cost compared to the high-loading in copper-based adsorbent. Accordingly, a copper-chromium-based activated carbon adsorbent is a more desirable adsorbent for the bed 202.

Figure 4:
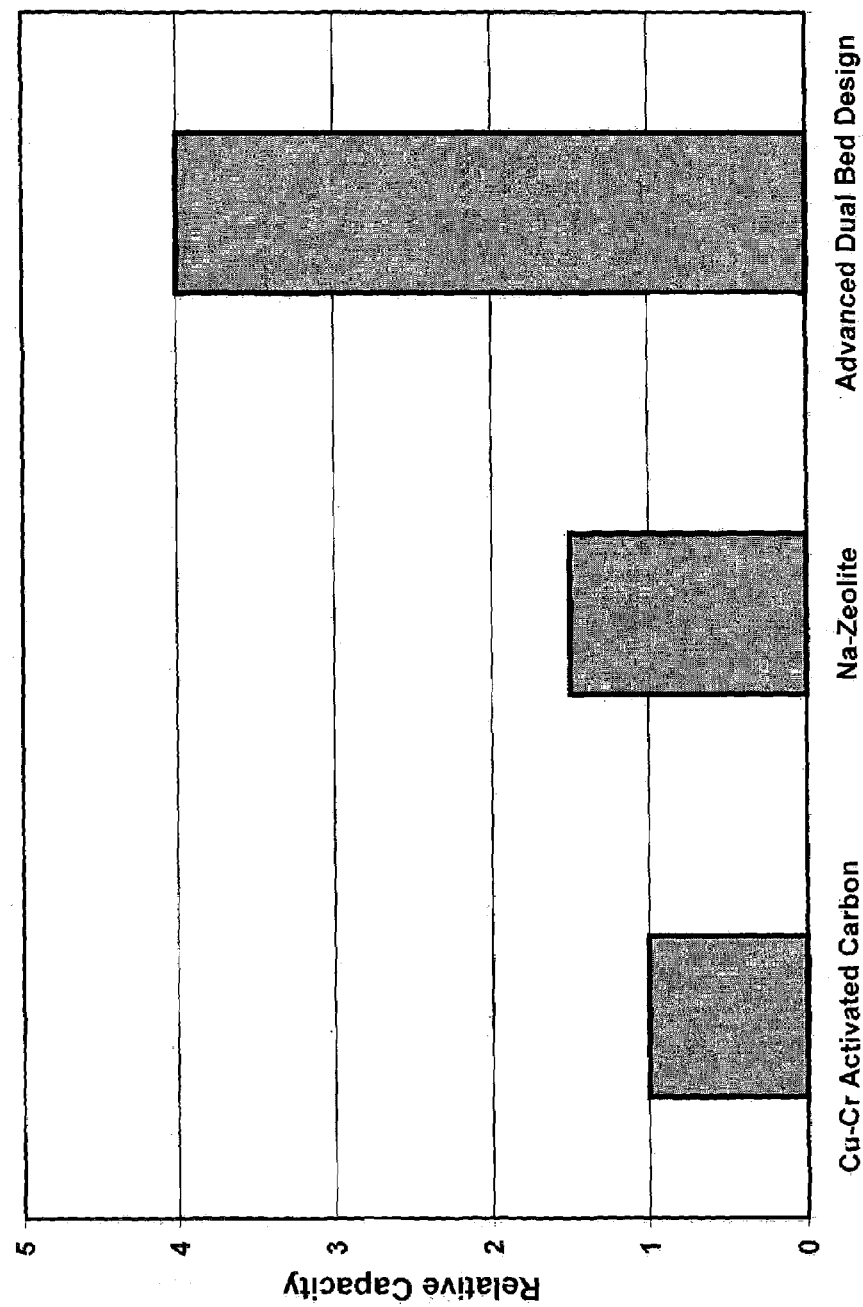
FIG. 4 shows relative capacity data of advanced ambient temperature adsorbents.

FIG. 4 is a bar graph comparing the relative capacities of conventional single-bed designs using copper-chromium-based activated carbon adsorbent and sodium-zeolite adsorbent with the relative capacity of the dual bed high-capacity sulfur adsorbent bed of the invention. The relative capacity of each adsorbent bed was tested under similar conditions. As can be seen in FIG. 4, the dual bed construction of the invention, as illustrated in FIG. 2, provides three times better capacity over a conventional single bed design using either one of the same adsorbents alone. The improved performance of the dual bed design of FIG. 2 provides increased operating life and increased adsorbent capacity for sulfur-containing compounds.

A detailed description of an illustrative configuration for the dual-bed 200 of the desulfurizer 106A of FIGS. 1 and 2 now will be described.

The high-capacity sulfur adsorbent bed 200 has been optimized for desulfurization of natural gas to be supplied to a 250 kilo Watt fuel cell power plant. The bed 202 comprises a copper-chromium-based activated carbon adsorbent containing at least 5% copper by weight and at least 2% chromium by weight, and having a volume of 15 cubic feet.

The bed 204 is a zeolite based adsorbent bed having a volume of 2 cubic feet. Each of the adsorbent beds is 6 feet in length and 24 inches in diameter. The optimal operating temperature range of the bed 200 is between 50 and 120 degrees Fahrenheit, the optimal operating pressure range is between 10 and 100 psig and the gas hourly space velocity of the fuel gas is between 100 and 500 per hour ($h^{-1}$). Test results have shown that a desulfurizer of this construction will reduce a 2 parts per million concentration of sulfur-containing compounds in the natural gas, including a 100 parts per billion concentration of DMS, to a total concentration of less than 10 parts per billion of sulfur-containing compounds. The life of a bed designed according to this construction is estimated at approximately between 9 and 12 months, which is three to four times the average life of adsorbent beds using a conventional KOH-based activated carbon adsorbent.

A bed of this construction may also be used for the desulfurization of propane gas with up to 200 parts per million concentration based on the volume of total sulfur. However, because propane gas has higher sulfur levels, the breakthrough concentrations will be reached faster than when the bed is used to desulfurize natural gas.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention. Thus, for example, various modifications of the adsorbent bed construction of the invention may be made to optimize the residence time and space velocity of the fuel gas as it is being passed through the bed. Moreover, other high-capacity adsorbents may be used in the bed of the invention in lieu of those discussed above.

What is claimed is:

1. A fuel processing system for processing fuel for a fuel cell comprising:
   a first adsorbent bed for adsorption of inorganic sulfur-containing compounds and high molecular weight organic sulfur-containing compounds;
   a second adsorbent bed for adsorption of low molecular weight organic sulfur-containing compounds;
   wherein said first and second adsorbent beds are arranged such that the fuel to be processed passes through one of said first and second adsorbent beds, and thereafter through the other of said first and second adsorbent beds;
   wherein said first and second adsorbent beds operate at a temperature between 50 and 120° F. and a pressure between 10 and 100 psig.

2. A fuel processing system according to claim 1, wherein said first adsorbent bed and said second adsorbent bed are disposed in a common reaction vessel.

3. A fuel processing system according to claim 2, wherein said one and said other of said first and second adsorbent beds are said first adsorbent bed and said second adsorbent bed, respectively.

4. A fuel processing system according to claim 3, wherein said first adsorbent comprises copper-based activated carbon.

5. A fuel processing system according to claim 4, wherein said first adsorbent comprises copper-chromium based activated carbon.

6. A fuel processing system according to claim 5, wherein said copper-chromium based adsorbent has at least 5 percent of copper by weight and at least 2 percent of chromium by weight.

7. A fuel processing system according to claim 6, wherein said second adsorbent comprises a zeolite.

8. A fuel processing system according to claim 7, wherein:
   said first adsorbent bed has a volume of 15 cubic feet;
   said second adsorbent bed has a volume of 2 cubic feet; and
   the gas hourly space velocity of the fuel flowing through said first adsorbent bed and said second adsorbent bed is between 100 and 500 $h^{-1}$.

9. A fuel processing system according to claim 1, further comprising:
   a third adsorbent bed for adsorption of inorganic sulfur-containing compounds and high molecular weight organic sulfur-containing compounds;
   a fourth adsorbent bed for adsorption of low molecular weight organic sulfur-containing compounds;
   wherein said third and fourth adsorbent beds are arranged such that the fuel to be processed passes through one of said third and fourth adsorbent beds, and thereafter through the other of said third and fourth adsorbent beds.

10. A fuel processing system according to claim 9, wherein said first and second adsorbent beds are disposed in a first common reaction vessel, and wherein said third and fourth adsorbent beds are disposed in a second common reaction vessel.

11. A fuel processing system according to claim 10, wherein:
   said one and said other of said first and second adsorbent beds are said first adsorbent bed and said second adsorbent bed, respectively; and
   said one and said other of said third and fourth adsorbent beds are said third adsorbent bed and said fourth adsorbent bed, respectively.

12. A fuel processing system according to claim 11, further comprising a conduit and valve assembly, wherein said conduit and valve assembly is such that said first common reaction vessel and said second common reaction vessel can be one of connected in series such that the fuel to be processed passes through one of said first and second common reaction vessels and then through the other of said first and second common reaction vessels and connected in parallel such that the fuel to be processed passes through one of said first and second common reaction vessels while the other of said first and second common reaction vessels is in standby mode.

13. A fuel processing system according to claim 12, wherein said conduit and valve assembly is such that said first common reaction vessel and said second common reaction vessel can be connected in a lead lag system such that the fuel to be processed passes through one of said first and second common reaction vessels while the other of said first and second common reaction vessels is in lag mode and such that when said one of said first and second common reaction vessels is exhausted, the fuel to be processed is redirected to said other of said first and second common reaction vessels.

14. A fuel processing system according to claim 13, further comprising a purging system for purging said fuel processing system.

15. A fuel processing system according to claim 14, wherein said purging system comprises a purge gas supply for delivering purge gas to said fuel processing system and a purge line for removal of purge gas from said fuel processing system.

16. A fuel processing system according to claim 13, further comprising a filter for removal of particulate matter from fuel, wherein said filter follows said first and second common reaction vessels in relation to the direction of the flow of fuel being processed.

17. A fuel processing system according to claim 1, wherein said high molecular weight organic sulfur-containing compounds have molecular weights greater than 65 and said low molecular weight organic sulfur-containing compounds have molecular weights equal to or less than 65.

18. A fuel processing system comprising:
a first adsorbent bed for adsorption of inorganic sulfur-containing compounds and high molecular weight organic sulfur-containing compounds;
a second adsorbent bed for adsorption of low molecular weight organic sulfur-containing compounds;
wherein said first and second adsorbent beds are disposed within a common reaction vessel;
wherein said first and second adsorbent beds operate at a temperature between 50 and 120° F. and a pressure between 10 and 100 psig.

19. A fuel processing system according to claim 18, wherein said adsorbent beds are arranged such that the fuel to be processed passes through one of said first and second adsorbent beds, and thereafter through the other of said first and second adsorbent beds.

20. A fuel processing system according to claim 19, wherein said one and said other of said first and second adsorbent beds are said first adsorbent bed and said second adsorbent bed, respectively.

21. A fuel processing system according to claim 20, wherein said first adsorbent bed comprises copper-based activated carbon.

22. A fuel processing system according to claim 19, further comprising:
a third adsorbent bed for adsorption of inorganic sulfur-containing compounds and high molecular weight organic sulfur-containing compounds;
a fourth adsorbent bed for adsorption of low molecular weight organic sulfur-containing compounds;
wherein said third and fourth adsorbent beds are disposed within a second common reaction vessel such that the fuel to be processed passes through one of said third and fourth adsorbent beds and, thereafter through the other of said third and fourth adsorbent beds.

23. A fuel processing system according to claim 22, wherein:
said one and said other of said first and second adsorbent beds are said first adsorbent bed and said second adsorbent bed, respectively; and
said one and said other of said third and fourth adsorbent beds are said third adsorbent bed and said fourth adsorbent bed, respectively.

24. A fuel processing system according to claim 23, wherein said first and third adsorbent beds comprise copper-based activated carbon and said second and fourth adsorbent beds comprise a zeolite.

25. A fuel processing system according to claim 24, further comprising a conduit and valve assembly interconnecting said first common reaction vessel and said second common reaction vessel, wherein said conduit and valve assembly is such that said first common reaction vessel and said second common reaction vessel can be one of connected in series such that the fuel to be processed passes through one of said first and second reaction vessels and then through the other of said first and second common reaction vessels and connected in parallel such that the fuel to be processed passes through one of said first and second common reaction vessels while the other of said first and second common reaction vessels is in standby mode.

26. A fuel processing system according to claim 25, wherein said conduit and valve assembly is such that said first common reaction vessel and said second common reaction vessel can be connected in a lead lag system such that the fuel to be processed passes through one of said first and second common reaction vessels while the other of said first and second common reaction vessels is in lag mode and such that when said one of said first and second common reaction vessels is exhausted, the fuel to be processed is redirected to said other of said first and second common reaction vessels.

27. A fuel processing system according to claim 18, wherein said high molecular weight organic sulfur-containing compounds have molecular weights greater than 65 and said low molecular weight organic sulfur-containing compounds have molecular weights equal to or less than 65.

28. A fuel processing method for processing fuel for a fuel cell comprising the steps of:
providing a mixture of fuel and sulfur-containing compounds;
adsorbing from said mixture inorganic sulfur-containing compounds and high molecular weight organic sulfur-containing compounds using a first adsorbent bed;
adsorbing from said mixture low molecular weight organic sulfur-containing compounds using a second adsorbent bed;
wherein said first and second adsorbent beds being disposed so that said mixture of fuel and sulfur-containing compounds passes through one of said first and second adsorbent beds and, thereafter through the other of said first and second adsorbent beds;
wherein said first and second adsorbent beds operate at a temperature between 50 and 120° F. and a pressure between 10 and 100 psig.

29. A fuel processing method according to claim 28, wherein said first and second adsorbent beds are disposed in a common reaction vessel.

30. A fuel processing method according to claim 29, wherein said organic sulfur-containing compounds having a high molecular weight and said inorganic sulfur-containing compounds are firstly adsorbed using said first adsorbent bed and said organic sulfur-containing compounds having a low molecular weight are thereafter adsorbed using said second adsorbent bed.

31. A fuel processing method according to claim 30, wherein said first adsorbent bed comprises a copper-based activated carbon adsorbent and said second adsorbent bed comprises a zeolite adsorbent.

32. A fuel processing method according to claim 28, wherein said high molecular weight organic sulfur-containing compounds have molecular weights greater than 65 and said low molecular weight organic sulfur-containing compounds have molecular weights equal to or less than 65.

33. A fuel processing method for processing fuel comprising the steps of:
providing a mixture of fuel and sulfur-containing compounds;
absorbing from said mixture inorganic sulfur-containing compounds and high molecular weight organic sulfur-containing compounds using a first adsorbent bed;

adsorbing from said mixture low molecular weight organic sulfur-containing compounds using a second adsorbent bed;

wherein said first and second adsorbent beds are disposed within a common reaction vessel;

wherein said first and second adsorbent beds operate at a temperature between 50 and 120° F. and a pressure between 10 and 100 psig.

34. A fuel processing method according to claim 33, wherein said organic sulfur-containing compounds having a high molecular weight and said inorganic sulfur-containing compounds are firstly adsorbed by said first adsorbent bed and said organic sulfur-containing compounds having a low molecular weight are thereafter adsorbed using said second adsorbent bed.

35. A fuel processing method according to claim 34, wherein said first adsorbent bed comprises a copper-based activated carbon adsorbent and said second adsorbent bed comprises a zeolite adsorbent.

36. A fuel processing method according to claim 35, wherein said high molecular weight organic sulfur-containing compounds have molecular weights greater than 65 and said low molecular weight organic sulfur-containing compounds have molecular weights equal to or less than 65.

37. A fuel processing system comprising:
a first adsorbent bed and a third adsorbent bed for adsorption of inorganic sulfur-containing compounds and high molecular weight organic sulfur-containing compounds;
a second adsorbent bed and a fourth adsorbent bed for adsorption of low molecular weight organic sulfur-containing compounds;
a conduit and valve assembly;
wherein said first and second adsorbent beds are disposed in a first common reaction vessel and are arranged such that the fuel to be processed passes through said first adsorbent bed, and thereafter through said second adsorbent bed, and said third and fourth adsorbent beds are disposed in a second common reaction vessel and are arranged such that the fuel to be processed passes through said third adsorbent bed, and thereafter through said fourth adsorbent bed;

wherein said conduit and valve assembly is such that said first common reaction vessel and said second common reaction vessel can be connected in a lead lag system such that the fuel to be processed passes through one of said first and second common reaction vessels while the other of said first and second common reaction vessels is in lag mode and such that when said one of said first and second common reaction vessels is exhausted, the fuel to be processed is redirected to said other of said first and second common reaction vessels.

38. A fuel processing system according to claim 37, wherein said first and third adsorbent beds comprise copper-based activated carbon and said second and fourth adsorbent beds comprise a zeolite.

39. A fuel processing system according to claim 4, wherein said second adsorbent comprises a zeolite.

40. A fuel processing system according to claim 39, wherein said zeolite is a sodium form zeolite.

41. A fuel processing system according to claim 21, wherein said second adsorbent bed comprises a zeolite adsorbent.

* * * * *

UNITED STATES PATENT AND TRADEMARK OFFICE
CERTIFICATE OF CORRECTION

| | |
|---|---|
| PATENT NO. | : 7,063,732 B2 |
| APPLICATION NO. | : 10/628653 |
| DATED | : June 20, 2006 |
| INVENTOR(S) | : Sai P. Katikaneni et al. |

It is certified that error appears in the above-identified patent and that said Letters Patent is hereby corrected as shown below:

Column 4, line 36, delete "closing valve 13" and insert --closing valve 113 --

Signed and Sealed this

Third Day of October, 2006

JON W. DUDAS
*Director of the United States Patent and Trademark Office*